Figure 1:
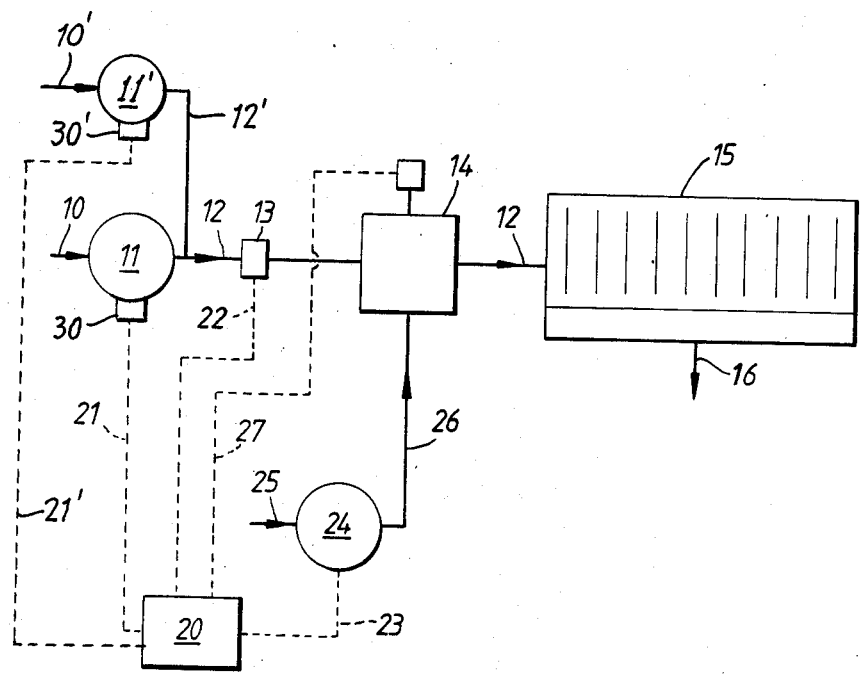

United States Patent [19]

Hoyland

[11] Patent Number: 4,675,116

[45] Date of Patent: Jun. 23, 1987

[54] DEWATERING SOLIDS SUSPENSIONS WITH CONTROLLED FLOCCULANT ADDITION

[75] Inventor: Garry Hoyland, Welwyn Garden City, England

[73] Assignee: Water Research Centre, Buckinghamshire, England

[21] Appl. No.: 756,449

[22] Filed: Jul. 18, 1985

[30] Foreign Application Priority Data

Jul. 26, 1984 [GB] United Kingdom ............... 8419035

[51] Int. Cl.[4] .......................... C02F 11/14; C02F 1/52
[52] U.S. Cl. ..................................... 210/709; 210/738; 210/739; 210/101; 210/105; 210/206
[58] Field of Search ...................... 210/96.1, 103, 105, 210/101, 205, 206, 709, 739, 738, 723, 87; 137/3, 9, 10

[56] References Cited

U.S. PATENT DOCUMENTS

| | | | |
|---|---|---|---|
| 2,268,461 | 12/1941 | Nichols | 210/205 |
| 3,584,840 | 6/1971 | Fuchs | 210/101 |
| 3,605,775 | 11/1969 | Zaander et al. | 210/709 |
| 4,170,553 | 10/1979 | Lang et al. | 210/96.1 |
| 4,198,298 | 4/1980 | Zuckerman et al. | 210/739 |
| 4,470,907 | 9/1984 | Sencza | 210/206 |
| 4,576,723 | 3/1986 | Eisenlauer et al. | 210/709 |

FOREIGN PATENT DOCUMENTS

| | | |
|---|---|---|
| 2353874 | 10/1973 | Fed. Rep. of Germany . |
| 2942740 | 5/1981 | Fed. Rep. of Germany . |
| 3025521 | 1/1982 | Fed. Rep. of Germany ...... 210/709 |
| 3103968 | 1/1982 | Fed. Rep. of Germany . |
| 0129747 | 10/1979 | Japan .................................. 210/96.1 |
| 487137 | 6/1938 | United Kingdom . |
| 1509969 | 5/1978 | United Kingdom . |
| 1603681 | 11/1981 | United Kingdom . |

OTHER PUBLICATIONS

Chemical Engineers' Handbook, 5th ed. edited by Perry and Chilton, 1973, McGraw-Hill Book Co., pp. 6-3.
Dillon et al., "Predicting Flowrates From Positive Displacement Rotary Pumps", Chemical Engineering, Jul. 22, 1985, pp. 57-60.

Primary Examiner—Benoit Castel
Assistant Examiner—Linda S. Evans
Attorney, Agent, or Firm—Watson, Cole, Grindle & Watson

[57] ABSTRACT

Solids suspensions are dewatered by filter plate pressing by adding a flocculant downstream of the filter press pump(s), the pump(s) being of the positive displacement type whereby the amount of flocculant required can be determined from the speed of the pump(s). Apparatus is provided which includes a filter plate press, one or more filter press pumps of the positive displacement type, and means for sensing the speed of the pump(s) and for controlling the dose of flocculant in dependence thereon. A mixer is constructed as a cylindrical chamber with radial inlets and axial outlets, and includes plate-like impellers.

12 Claims, 3 Drawing Figures

DEWATERING SOLIDS SUSPENSIONS WITH CONTROLLED FLOCCULANT ADDITION

This invention relates to dewatering solids suspensions by filter plate pressing.

Filter plate pressing is commonly used for dewatering suspensions such as sewage and biological sludges, coal slurries and pottery wastes. Essentially, the process consists of flocculating the solids in suspension by adding a chemical, and then pumping the flocculated suspension at pressures up to about 15 bar into filter plate presses comprising a series of chambers with permeable walls. Water passes through the walls, leaving in the chambers the solids which form a cake with residual water. When full of cake, the chambers are opened and the cakes removed. The chemicals used to flocculate the solids are solutions of either inorganic salts of multi-valent cations or poly-electrolytes.

There are two main methods used in current practice for adding the flocculant solutions to the suspensions. One method involves batchwise addition in a stirred vessel, and the other comprises injecting the solution continuously into either the inlet pipe or the inlet chamber of the pump. In both methods, the addition is made on the suction side of the press feed pump such that the flocculated suspension then has to pass through the pump. During its passage through the press feed pump and associated pipework, the suspension inevitably experiences turbulence which partially breaks down the flocs, thereby causing the filtering properties of the suspension to deteriorate. Floc breakdown is particularly severe when polyelectrolytes are used as the flocculant, when process times required to complete filtrations can be increased by factors of 2 and more.

German Offenlegungsschrift No. 2353874 recognizes this problem and proposes the solution of adding the flocculant to the suspension downstream of the press feed pump. However, the problem of adding flocculant accurately remains. With prior known (and currently used) processes where dosing occurs on the low pressure side of the pump, reciprocating pumps are used which draw in a dose of flocculant together with suspension to be treated. The arrangement is not very accurate but is reasonably satisfactory in practice. Clearly, however, with high pressure dosing (i.e. introduction of flocculant downstream of the high pressure side of the pump) the same technique cannot be used.

The German specification teaches instead that a flowmeter be included in the main suspension flow on the high pressure side of the press feed pump, signals from the flowmeter being used to control the amount of flocculant dosed into the suspension. In practice, however, this arrangement is not at all satisfactory and does not permit accurate dosing of flocculant during a complete working cycle of the filter press. We have investigated this problem and have found that it arises from the fact that a flowmeter cannot accurately respond to the very large range of flowrates occurring. Thus, during the course of filter pressing, the flowrate of suspension entering the press can vary, between the beginning and the end of pressing, by a factor of 30 to 40, and this is too great for accurate flowmeter response over the whole range. Accordingly, whilst the proposal in the German specification to effect dosing on the high pressure side of the pump is in itself an attractive proposition, it cannot actually be effected accurately by the method there described. In fact, so far as we are aware, it has never satisfactorily been accomplished.

We have now found a reliable and efficient method of detecting flowrates throughout a filter pressing cycle, which method can be used with high pressure flocculant dosing and hence enables the advantages of high pressure dosing to be realized.

In one aspect, the present invention provides a method of dewatering a solids suspension, which comprises adding a flocculant and subjecting the mixture to filter pressing, the flocculant being added to the suspension downstream of the press feed pump, wherein the press feed pump is a positive displacement pump and the amount of flocculant added to the suspension is controlled in dependence on the speed of the press feed pump.

Thus, by using a positive displacement pump as the press feed pump, a measure of the flowrate of suspension on the high pressure side of the pump can be obtained directly from the speed of the pump and this, in turn, is utilized to control the amount of flocculant being added. In this way, the amount of flocculant added can be accurately controlled over virtually the whole of the filter press cycle so that it is appropriate to the suspension flowrate. Typical positive displacement pumps which may be used are the reciprocating piston, diaphragm, peristaltic, progressive cavity and lobe types.

To ensure that the dose is accurate using this method, a calibration curve between pump speed and suspension flowrate is required. For reciprocating pumps with inlet and outlet valves, flowrate can usually be assumed to be directly proportional to speed, with little loss of accuracy. Peristaltic, progressive capacity and lobe type pumps can, however, suffer from slippage, that is the back flow of delivered suspension through the pump. When using these types, therefore, the relationship between speed and flow should be experimentally determined. For example, the relationship between flowrate (F) through a peristaltic pump and the pressure increase (P) has been found to comply with an equation of the following form:

$$F = aS - bP$$

where S is pump speed and a and b are constants for the particular pump. The second term of the right hand side of this equation represents the slippage which is proportional to the pressure increase (P).

Any inaccuracy in determining suspension flowrate from pump speed can be minimised by choosing feed pumps of different sizes. In accordance with the above equation, loss in volumetric efficiency owing to slippage is highest at low pump speeds. Thus by switching between pumps of different sizes during a press cycle to maintain high pump speeds at all times any loss in volumetric efficiency can be minimized.

Alternatively, we could use a flowmeter in the sludge or filtrate line to measure the low flowrates directly, i.e. to measure flowrates which are about 5% or less of the maximum duty of the feed pump(s).

In one preferred arrangement of the invention, a dosing pump is used to dose the flocculant solution into the delivery pipe of the feed pump, the dosing pump having a positive displacement and being capable of delivering the required quantity of flocculant solution at a pressure slightly above the operating pressure of the filter press. Since the flocculant solution is usually dosed in direct proportion to the flowrate of the suspension, the dosing system must of course be capable of delivering the flocculant solution over a wide range of flowrates and, for this purpose, a dosing system comprising several variable speed pumps of different sizes and operating sequentially as required, can advantageously be used.

A control system may be used to regulate the speed of the dosing pump (or pumps) in accordance with the required flowrate of the flocculant solution. In one such system, one dosing pump when driven by a variable speed reluctance motor can cover the full range of dosing rates. In another system the dosing pump (or pumps) are driven with an induction motor, for example, which may be controlled by a frequency inverter. In dosing systems containing several dosing pumps, the same inverter can be used to drive all the motors through relays as required. The switching between pumps, and pump speed can be controlled by an electronic processor which can, for example, calculate the required dose of the flocculant solution from the flowrate of the suspension, as measured by the speed of the pumps or exceptionally, at low flowrates by a flowmeter of the required sensitivity.

Figure 2:
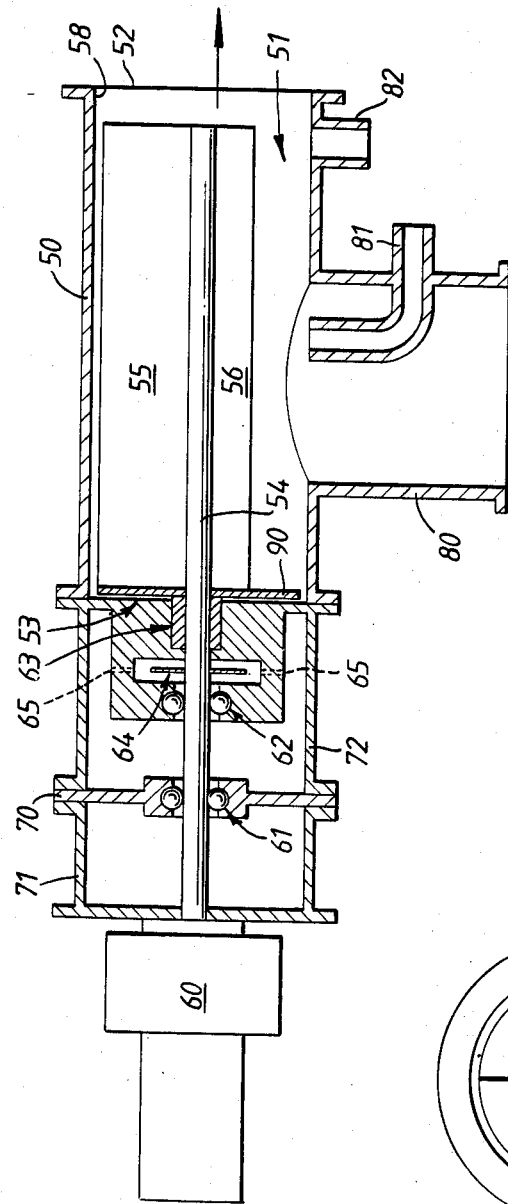
Figure 3:
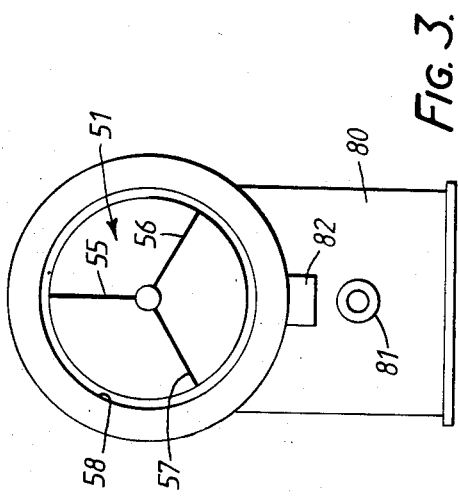

In order that the invention may be more fully understood, reference is made to the accompanying drawings, wherein:

FIG. 1 shows schematically one arrangement in accordance with the invention; and FIG. 2 is an axial section of a preferred in-line mixer suitable for use in the arrangement of FIG. 1, and FIG. 3 is an end elevation of the mixer of FIG. 2.

Referring to FIG. 1, there are shown supply lines 10 and 10' for supplying suspension from a source (not shown) to the low pressure side of positive displacement press feed pumps 11 and 11', of different size, which deliver the suspension under high pressure respectively to lines 12. In line 12 is a low flowrate flowmeter 13, a mixer 14 and 12' and finally the filter press 15. A filtrate line 16 carries filtrate from the press 15. The directions of fluid flow in the Figure are indicated by the arrows.

An electronic processor 20 is connected via electrical lines 21, 21' to speed sensors 30 and 30' on pumps 11, 11' or on the drives, and processor 20 is also connected to the flowmeter 13 by electrical line 22. The processor is thus able to receive signals from the pumps 11, 11' and the flowmeter 13. Processor 20 has an output line 23 connected to a flocculant pump 24 which is connected to low pressure flocculant supply line 25 and high pressure line 26. Line 26 opens into the mixer 14. A control cable 27 is also provided between mixer 14 and processor 20.

In operation, the suspension to be filtered is pumped along lines 10, 10' and 12 (by pumps 11, 11') into and through the mixer 14 where it is mixed with flocculant delivered via line 26 by pump 24. The amount of flocculant is varied by varying the operation of pump 24 in dependence on the flowrate of the suspension in (or into) line 12. This flowrate is sensed from the speed of pumps 11, 11' using, for example, tachometers 30, 30' on the pumps or directly from the pump drives. At the lowest flowrates, a flowmeter 13 if installed may be used to sense the flowrate instead of relying on the speed of pumps 11, 11'.

FIGS. 2 and 3 show somewhat schematically one form of in-line flocculant solution/suspension mixer. The mixer comprises a cylindrical body 50 constituting a mixing chamber 51. The chamber is open at one end 52 (the right-hand end as shown in FIG. 2) for connection to line 12 leading to the press 15. The other end of chamber 51 is closed by a low clearance impeller back-plate 53. Extending through back-plate 53 and axially into chamber 51 is a drive-shaft 54 on which is mounted a circular disc 90 and three plate-like impellers 55, 56, 57 each extending longitudinally of the chamber at 120° with respect to the other two (see FIG. 3). As can be seen, each impeller extends radially outwardly from the shaft 54, almost to the inner wall 58 of body 50. Disc 90, at one end of the impellers (the left-hand end as viewed in FIG. 2), protects the seal 63 from any debris that may be present in the suspension.

The drive shaft 54 is connected to a drive motor/gear box combination 60, passing through bearing assemblies 61, 62 and a mechanical seal 63 on the backplate 53. To cope with any small fluid leakage through seal 63, a disc 64 is mounted coaxially on shaft 54, to throw leak fluid centrifugally outwardly through drainage holes 65. This particular leak fluid disposal arrangement has nothing to do with the present invention and will not be further described. Bearing assembly 61 includes a support member 70 conveniently mounted between two coaxially arranged cylindrical bodies 71, 72 containing the bearing assembly 62, fling plate 64 and seal 63, as shown schematically in FIG. 2.

Communicating radially with chamber 51 is suspension inlet pipe 80. Also two flocculant supply pipes 81, 82 are shown (in practice, only one will normally be used). Pipe 81 passes through the wall of pipe 80 and both terminate level with inner wall 58 of body 50. Pipe 82 is downstream of pipe 80 and is disposed radially of body 50, again terminating at inner wall 58 of body 50.

In one preferred arrangement that can handle suspension flowrates of up to 150 m$^3$/h, the appropriate diameter of inlet 80 is 200 mm and the maximum speed of drive shaft 54 is about 500 rpm.

In operation of the mixer, suspension and flocculant (the latter is controlled quantity) are fed into chamber 51 while the impellers are rotated to cause mixing of the suspension and flocculant. The mixture passes out of chamber 51 via end 52, to the filter plate press. It is preferred to add the flocculant to the suspension either as the latter enters the mixing chamber 51 or immediately thereafter. If flocculant is added to the suspension upstream of the mixing, the overall results tend not to be as good.

The motor used in the mixer of FIGS. 2 and 3 can be an induction motor, a variable speed reluctance motor or a DC motor. Best results are obtained from the flocculant when the motor speed is changed by the controller 20 during a pressing cycle in accordance with the flowrate and viscosity of the suspension. The impeller is so designed as to create maximum mixing without the problem of fouling with debris such as fibers that may be present in the suspension.

The point of mixing should be close to the press inlet such that any deterioration in the filterability of the conditions sludge owing to turbulence in the delivery pipe is reduced to a minimum. At installations comprising several presses connected to a common inlet manifold, good results can be obtained by mixing the flocculant solution about 1 m upstream from the manifold entrance.

I claim:
1. A method of dewatering a solids suspension, which comprises pumping the suspension to a filter plate press using a press feed pump which is a positive displacement pump; adding a flocculant to the suspension downstream of the press feed pump but upstream of the filter plate press; controlling the amount of flocculant added in dependence on the flowrate as measured by the speed of the press feed pump, except when during a press cycle of the press feed pump the suspension flowrate from the press feed pump is low compared with the maximum duty of the press feed pump during which the flowrate is measured by a flowmeter; and removing water from the suspension to dewater the same in the filter plate press.

2. A method according to claim 1, which comprises feeding the flocculant into admixture with the suspension using at least one positive displacement pump.

3. A method according to claim 1, which comprises mixing the suspension with the flocculant by passing both radially into a cylindrical chamber comprising one or more rotating impellers therein, and exiting the mixture from one end of the chamber axially thereof, for passage therefrom directly to said filter plate press.

4. A method of dewatering a solids suspension, which comprises pumping the suspension to a filter plate press and maintaining high press feed pump speeds throughout a press cycle using two press feed pumps of different size which are positive displacement pumps, adding a flocculant to the suspension downstream of the press feed pumps but upstream of the filter plate press, controlling the amount of flocculant added in dependence on the speeds of the press feed pumps, and removing water from the suspension to dewater the suspension in the filter plate press.

5. A method according to claim 4, which comprises feeding the flocculant into admixture with the suspension using at least one positive displacement pump.

6. A method according to claim 4, which comprises mixing the suspension with the flocculant by passing both radially into a cylindrical chamber comprising one or more rotating impellers therein, and exiting the mixture from one end of the chamber axially thereof, for passage therefrom directly to said filter plate press.

7. Apparatus for dewatering a solids suspension by filter pressing, which comprises a filter plate press, a feed pump for pumping said suspension to the filter press, means for mixing flocculant with the suspension downstream of the feed pump, means for sensing the flowrate of the suspension to the filter press, and means for controlling the amount of flocculant mixed with the suspension in dependence on the sensed flowrate; wherein said feed pump is a positive displacement pump and said means for sensing the flowrate comprises means for measuring the speed of the feed pump and a flowmeter to measure said flowrate when the latter drops to levels that are low compared with the maximum duty of the feed pump.

8. Apparatus according to claim 7, wherein said mixing means comprises a cylindrical chamber having an axial outlet at one end for the mixture, and radial inlets for the suspension and flocculant, the chamber including one or more rotatable plate-like impellers.

9. Apparatus according to claim 7, which comprises at least one positive displacement pump for pumping flocculant to the mixing means.

10. Apparatus for dewatering a solids suspension by filter pressing, which comprises a filter plate press, two or more feed pumps of different size for pumping said suspension to the filter press, means for mixing flocculant with the suspension downstream of the feed pumps, means for sensing the flowrate of the suspension to the filter press, and means for controlling the amount of flocculant mixed with the suspension in dependence on the sensed flowrate; wherein said feed pumps are positive displacement pumps and said means for sensing the flowrate comprises means for measuring the speeds of the feed pumps of different size, whereby high pump speeds are maintained throughout a press cycle.

11. Apparatus according to claim 10, wherein said mixing means comprises a cylindrical chamber having an axial outlet at one end for the mixture, and radial inlets for the suspension and flocculant, the chamber including one or more rotatable plate-like impellers.

12. Apparatus according to claim 10, which comprises at least one positive displacement pump for pumping flocculant to the mixing means.

* * * * *